March 18, 1941.  J. LAUTERBACH  2,235,222
MOLD CHARGING MECHANISM
Filed Feb. 23, 1938  4 Sheets-Sheet 1
FIG-1-
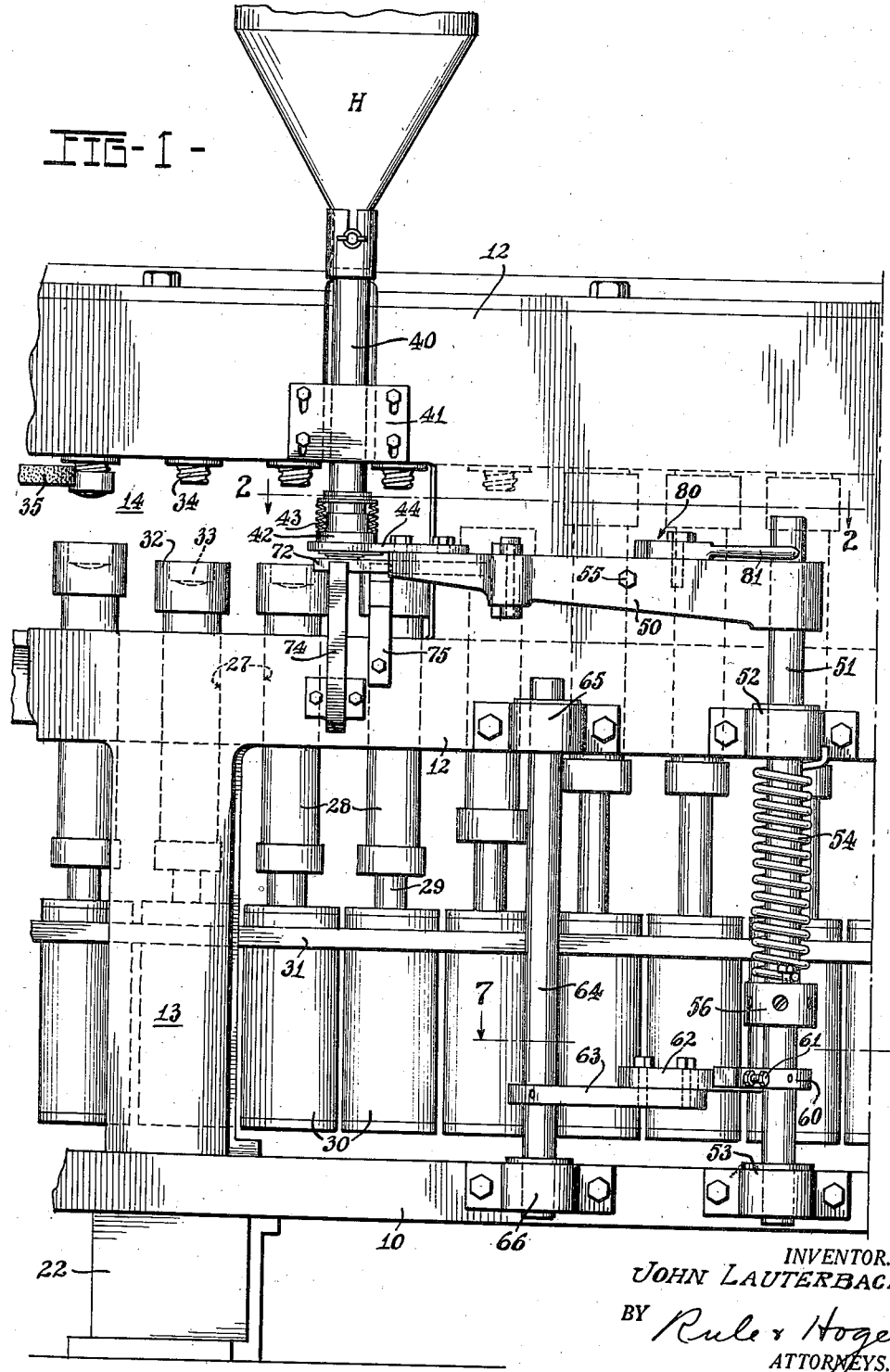
INVENTOR.
JOHN LAUTERBACH.
BY Rule & Hoge
ATTORNEYS.

March 18, 1941. J. LAUTERBACH 2,235,222
MOLD CHARGING MECHANISM
Filed Feb. 23, 1938 4 Sheets-Sheet 2
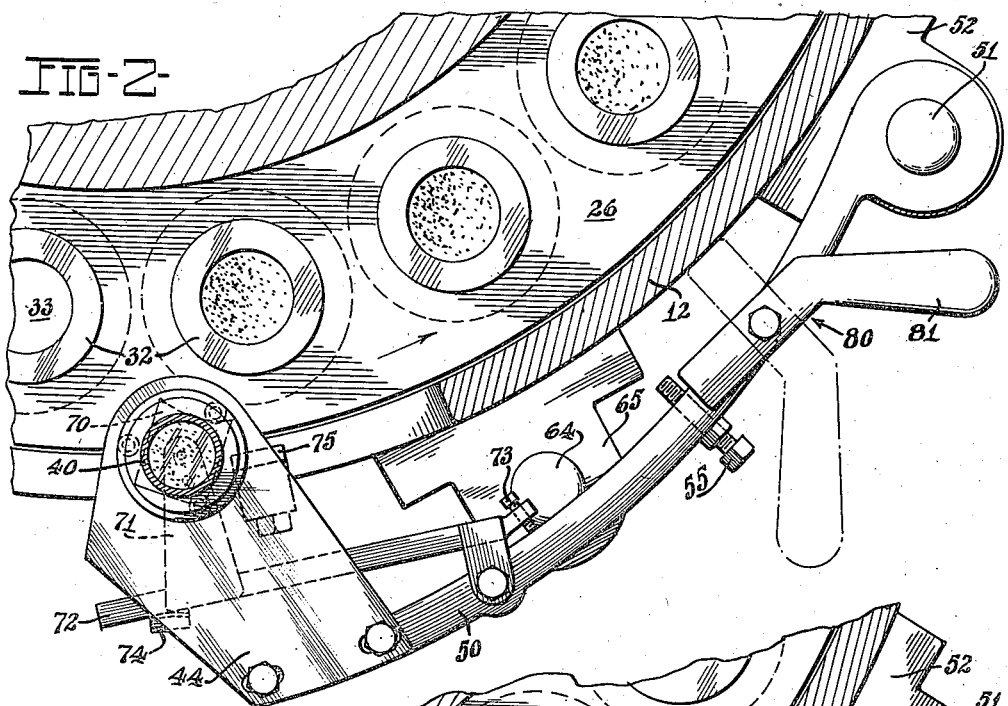
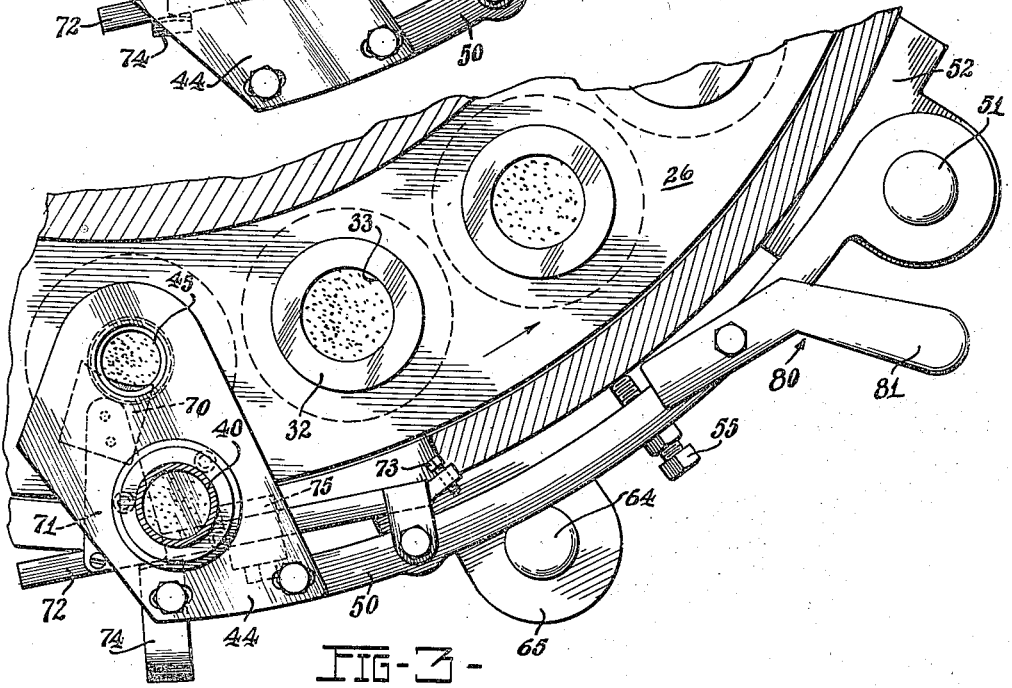
INVENTOR.
JOHN LAUTERBACH.
BY Rule & Hoge
ATTORNEYS.

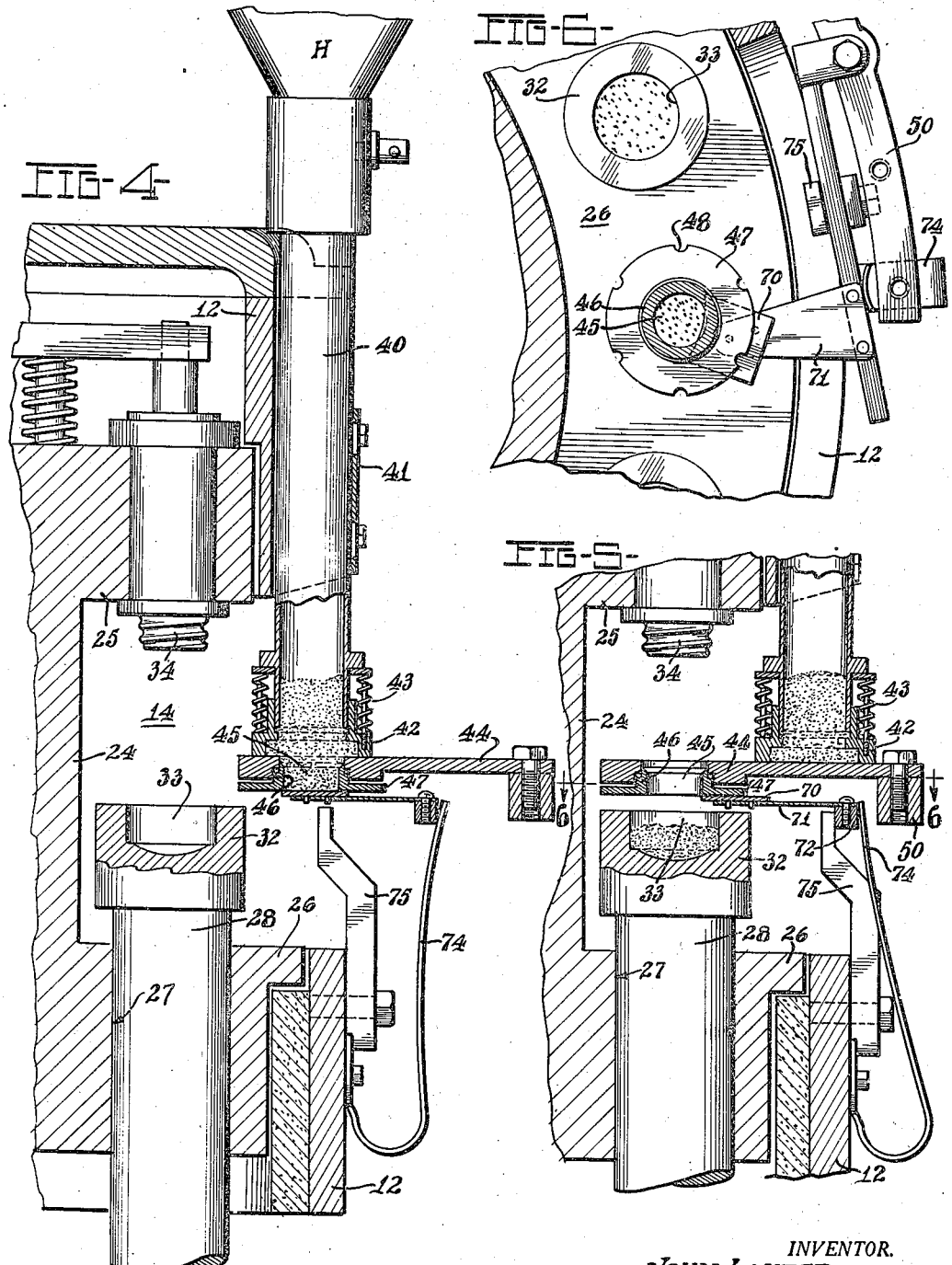

March 18, 1941. J. LAUTERBACH 2,235,222
MOLD CHARGING MECHANISM
Filed Feb. 23, 1938 4 Sheets-Sheet 4
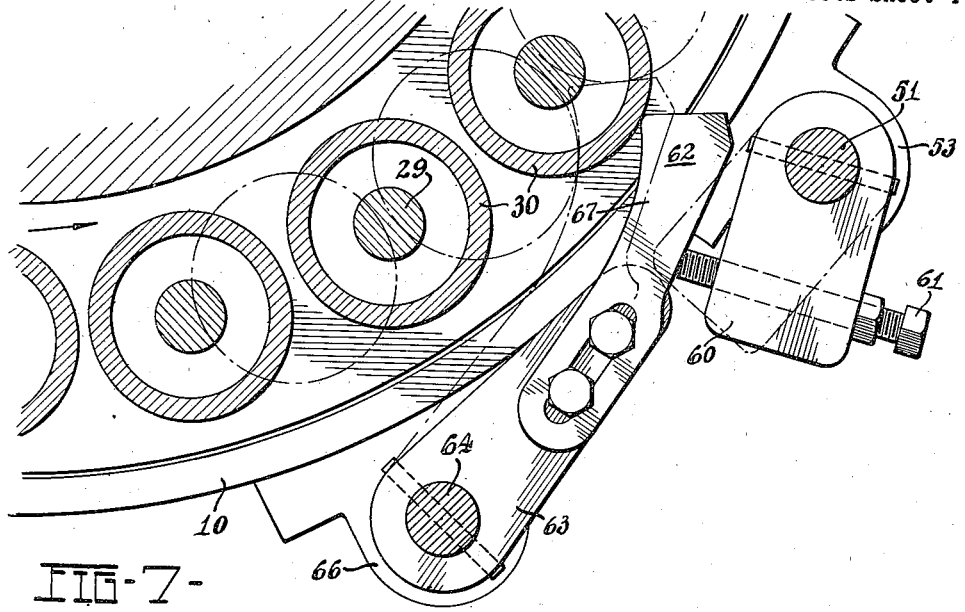
FIG-7-
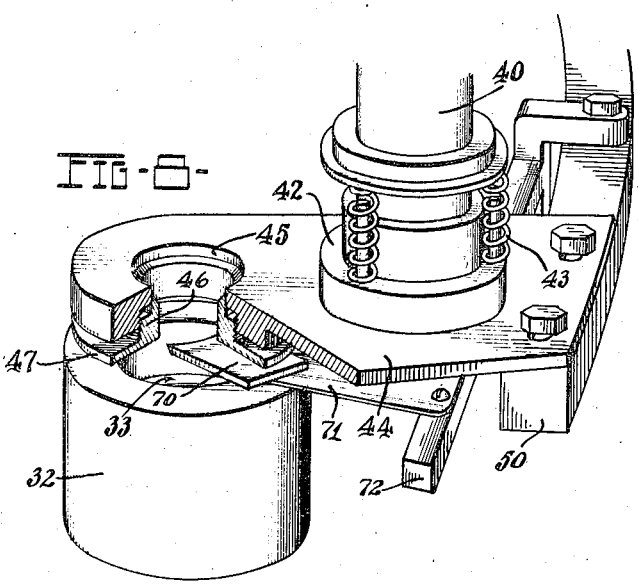
FIG-8-
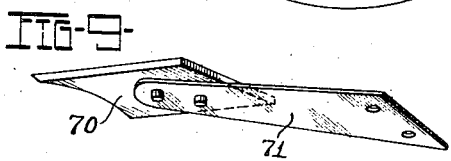
FIG-9-
INVENTOR.
JOHN LAUTERBACH.
BY Rule & Hoge
ATTORNEYS.

Patented Mar. 18, 1941

2,235,222

UNITED STATES PATENT OFFICE 2,235,222

MOLD CHARGING MECHANISM

John Lauterbach, Philadelphia, Pa., assignor to Owens-Illinois Glass Company, a corporation of Ohio Application February 23, 1938, Serial No. 192,088

5 Claims. (Cl. 18—30)

The present invention relates to feeding mechanism for automatically transferring measured charges of granular or powdered moldable material from a supply body thereof contained in a hopper or other receptacle, to the individual molds of a molding machine.

The improved mechanism comprising the present invention is primarily adapted for use in connection with molding machines of the rotary type wherein a plurality of molding units or dies are moved progressively and continuously through a predetermined cycle of operations, the molding material being fed to the dies at one point in the cycle.

The principal object of the invention is to provide a rugged and durable feeding mechanism comprised of a minimum number of moving parts which may be attached to the casing or other stationary part of the molding machine and which will cooperate with the moving parts thereof in such a manner as to be actuated thereby.

Another object of the invention is to provide a feeding mechanism which will transfer measured charges of moldable material from a supply body thereof to the individual molds of the molding machine with practically no loss of material due to spilling thereof or to the creation of material dust in the atmosphere.

Another object of the invention is to provide such a mechanism which is readily adjustable to accommodate different machines or to accommodate the different operating characteristics of the same machine.

Other objects of the invention, not at this time enumerated, will become readily apparent hereinafter.

One embodiment of the invention is illustrated in the accompanying drawings in which:

Fig. 1 is a fragmentary side elevational view of a molding machine, showing the improved feeding device attached thereto;

Fig. 2 is an enlarged sectional view taken substantially along the line 2—2 of Fig. 1;

Fig. 3 is a sectional view similar to Fig. 2 showing the feeding device in the act of charging a mold;

Fig. 4 is an enlarged fragmentary side elevational view of the apparatus, partly in section, showing the same attached to the forming machine and showing certain parts of the latter in section;

Fig. 5 is a fragmentary side elevational view similar to Fig. 4 with substantially the same parts shown in section and showing the charging element in alignment with and in charging relation to one of the molds of the molding machine;

Fig. 6 is a sectional view taken substantially along the line 6—6 of Fig. 5;

Fig. 7 is a sectional view taken substantially along the line 7—7 of Fig. 1;

Fig. 8 is an enlarged perspective view, partly in section, of a portion of the apparatus showing a mold with the actual charging instrumentalities in charging relation thereto; and Fig. 9 is an enlarged perspective view of a movable charge support employed in connection with the present invention.

Referring now to Fig. 1, a portion of a molding machine in the vicinity of the charging zone thereof is shown and involves in its general organization a base member 10 in the form of a ring which is supported upon legs 22. A casing 12 which is supported by means of webs 13 from the base member 10 is provided with a slot or opening 14 therein at the front of the machine through which the various molds are supplied with moldable material and through which the formed articles are removed from the machine. Rotatably supported within the casing 12 adjacent the top thereof is a drum 24 (Fig. 4) having relatively thick continuous upper and lower radial flanges 25 and 26 respectively. The drum 24 serves to support an annular series of mold heads or units thereon. Accordingly the lower flange 26 is provided with a series of vertical bores 27 in which are supported for vertical sliding movement a plurality of cylindrical members 28 which are supported at their lower ends on piston rods 29 (Fig. 1) associated with an annular series of hydraulic cylinders 30 which are supported in the peripheral region of a rotary table 31 and each of which is incorporated in and forms a part of one of the mold heads or units. A mold 32 or die element having an open cavity 33 is supported on the upper end of each of the cylindrical members 28. The die elements are designed for cooperation with a series of mandrels 34 or die elements which are aligned therewith and which are supported about the periphery of the upper flange 25.

An ejecting mechanism 35 which is common to all of the mandrels 34 is provided for stripping the formed articles therefrom in the vicinity of the charging zone.

The above described mechanism is conventional in its design insofar as the present application is concerned and no claim to novelty therefor is made herein. The moldable material is fed to the die elements 32 at the charging zone through the opening 14 in the casing 12 and immediately thereafter the charged die elements 32 are elevated by the hydraulic cylinders 30 into forming cooperation with the mandrels 34. The die elements 32 proceed through a forming cycle during which they are heated and the material therein is cured and, as they again approach the opening 14 they are lowered and the formed articles are removed from the mandrels 34 by means of the ejecting mechanism 35. The operation is continuous.

Referring again to Fig. 1, the moldable material is contained in a charging hopper H which communicates with a vertical chute 40 which is adjustably secured by means of a plate 41 to the casing 12 at the forward side of the machine. The lower end of the chute 40 terminates in the charging zone in the vicinity of the revolving molds or dies 32 and is provided with a sealing sleeve 42 which is telescopically mounted thereon and which is normally held by means of springs 43 in yielding engagement with a charging plate 44 which is slidable therebeneath. The charging plate 44 is formed with a charging opening 45 therein which is preferably slightly smaller in diameter than the diameter of the die cavities 33 and which is movable with the charging plate 44 from a position of register with the chute 40 to positions of register with the individual dies 32. The opening 45 is provided with an enlarged threaded portion 46 (Fig. 5) which threadedly and interchangeably receives therein any one of a number of charging elements 47 of different size. A series of spanner notches 48 (Fig. 6) are formed in the periphery of the charging element 47 to facilitate substitution of elements in the charging plate 44.

The charging plate 44 is secured to the free end of a charging arm 50 (Figs. 1, 2 and 3) for longitudinal adjustment thereon. The other end of the arm 50 is keyed for vertical adjustment to a vertically extending rock-shaft 51 which is mounted in bearings 52 and 53 secured to the casing 12 and base member 10 respectively. A coil spring 54 surrounding the rock-shaft 51 has one end thereof secured to an angularly adjustable collar 56 and applies a torque to the rock-shaft 51 in such a manner as to urge the charging arm inwardly toward the molding machine so that the charging plate 44 normally assumes a charging relation with respect to the individual die elements 32. Angular adjustment of the collar 56 on the shaft 51 permits the tension of the spring 54 to be varied. The innermost position of the charging plate 44 is controlled by means of a set screw 55 extending through the arm 50 and adapted to bear against the casing 12 to limit the inward swinging movement of the arm. It will be seen that by adjusting the position of the charging plate 44 on the charging arm 50 and by manipulating the set screw 55, the opening 45 in the plate 44 may accurately be aligned with the die cavities 33 of the various die elements 32 when the charging plate 44 is in its innermost or charging position.

Referring now to Figs. 1 and 7, wherein the actuating mechanism for the rock-shaft 51 is illustrated, a cam member 60 or follower is secured to the rock-shaft 51 adjacent the bottom thereof and is provided with a set screw 61 adapted to bear against a cam member 62 which is adjustably secured to the free end of a rock-arm 63. The other end of the rock-arm 63 is secured to a vertically extending rock-shaft 64 which is mounted in bearings 65 and 66 secured to the casing 12 and base member 10 respectively.

The coil spring 54, acting through the shaft 51, cam follower 60 and set screw 61, normally urges the cam member 62 inwardly and causes the same to be interposed in the path of movement of the revolving series of hydraulic cylinders and, by engagement with successive cylinders, to be actuated thereby. The inner side of the cam member 62 is curved as at 67 (Fig. 7) for engagement with the oncoming cylinders 30, while the outer side thereof is substantially straight and is designed for engagement with the set screw 61.

In the outermost position of the cam member 62 as shown in full lines in Fig. 7, the follower 60 is held outwardly away from the molding machine and the charging arm 50 and plate 44 assume a position wherein the charging opening 45 is in register with the lower end of the chute 40.

In the innermost position of the cam member 62 as shown in dotted lines in Fig. 7, the cam surface 67 of the cam member 62 is in engagement with the side of one of the cylinders 30 and the follower 60 assumes its innermost position with the charging arm 50 and plate 44 assuming the position shown in Fig. 3 wherein the charging opening 45 is in register with the cavity 33 of one of the die elements 32.

The center-to-center distance between adjacent cylinders 30 being equal to the center-to-center distance between adjacent die elements 32, actuation of the charging arm 50 in timed relation to the arrival of the die elements at the charging zone will be attained regardless of the rate of speed at which the molding machine is driven and regardless of the fact that the cam member 62 at the precise moment of charging of one of the die elements 32 cooperates with a cylinder 30 which is three times removed from the actuating cylinder for the die being charged.

Referring now to Figs. 2, 4, 5 and 6, in order to effectively close the bottom of the charging opening 45 in the charging plate 44 and charging element 47 when the opening is in register with the chute 40, a closure plate 70 or shutter plate is mounted on one end of an arm 71 which is secured adjacent the free end of a shutter arm 72 which is in turn pivoted to the charging arm 50 medially thereof for relative swinging movement with respect thereto. The shutter plate 70 is adapted to normally underlie the charging element 47 when the latter is retracted to its position of registry with the chute 40, and is movable inwardly with the charging element as the latter moves inwardly to charge the die elements 32. Accordingly, when the charging arm 50 is in its outermost position as shown in Fig. 2, a set screw 73 limits the inward swinging movement of the shutter arm 72 and permits the inward swinging movement of the shutter arm 72 and permits the shutter plate 70 to be aligned with the charging opening 45. While in this position, a leaf spring 74 (Fig. 4) secured to the casing 12, bears against the shutter arm 72 and normally urges the same inwardly to its position of registry with the charging opening 45.

An abutment 75 or limit stop (Fig. 6) secured to the casing 12 projects upwardly into the path of movement of the shutter arm 72. Thus when the charging arm 50 is swung inwardly and the charging plate 44 is moved inwardly to its charging position with the shutter plate 70 beneath the charging opening 45, the abutment 75 terminates the inward movement of the shutter plate 70 when the inner forward edge thereof overlies the edge of the particular die cavity 33 which is about to receive a charge of moldable material from the charging element 47. The charging arm 50 however continues its inward movement until the charging cavity 45 is in registry with the die cavity 33 and thus the moldable material contained in the charging cavity, no longer being supported on the shutter plate 70, falls by gravity into the cavity 33 of the mold 32.

In order to render the charging device inoperative, as for example when it is desired to inspect the condition of the die elements, mandrels or other instrumentalities or to substitute die elements in the molding machine without ceasing the operation of the latter, a locking member 80 (Fig. 2) is pivoted to the charging arm 50 medially of its ends. The locking member 80 is provided with a handle 81 by means of which the member may be swung to the dotted line position with the free end thereof bearing against the casing 12 to prevent the charging arm 50 from being swung inwardly.

It is thought that from the above description of the improved feeding device the operation thereof will readily be understood.

By virtue of the fact that the sealing sleeve 42 is yieldingly pressed against the charging plate 44 which slides therebeneath, and by virtue of the fact that the charging element 47 does not move over the forward edge of the shutter plate 70 until after it has moved over the edge of the mold cavity 33, loss of material due to spilling thereof is reduced to a minimum. Furthermore, since the material contained in the hopper H is completely sealed from the atmosphere until such a time as the individual charges are released and discharged into the mold cavities, dusting of the material into the atmosphere is reduced to a minimum.

Modifications may be resorted to within the spirit of the appended claims.

I claim:

1. Feeding mechanism for rotary molding machines of the type including a stationary casing, a rotary carriage disposed within the casing, an annular series of mold units mounted on the carriage and movable therewith, each unit including a mold having an upwardly facing mold cavity, and means for rotating the carriage to move the individual molds successively through a charging zone, said mechanism including a stationary chute for moldable material, a rock-shaft pivoted to the casing, a charging arm secured to the rock-shaft, charge transferring instrumentalities mounted on the charging arm for transferring measured charges of moldable material from the chute to the mold cavities of successive molds passing through the charging zone, a second rock-shaft pivoted to the casing, and means connecting the two rock-shafts to impart rocking movement from the first mentioned shaft to the last mentioned shaft, said connecting means including a member secured to the latter shaft and projecting into the path of movement of the mold units and engageable therewith.

2. Feeding mechanism for rotary molding machines of the type including an annular series of mold units and means for rotating said series about a vertical axis, said mechanism comprising a stationary support, a rock-shaft pivoted to the support, a charging arm secured to the rock-shaft, charging instrumentalities on the arm, a second rock-shaft pivoted to the support, and means connecting the rock-shafts to impart rocking movement of one shaft to the other, said means including a member secured to the last mentioned shaft and projecting into the path of a moving part of each of the mold units and engageable therewith.

3. Feeding mechanism for rotary molding machines of the type including an annular series of mold units and means for rotating said series about a vertical axis, said mechanism comprising a stationary support, a rock-shaft pivoted to the support, a charging arm secured to the rock-shaft, charging instrumentalities on the arm, a second rock-shaft pivoted to the support, and cam means connecting the rock-shafts to impart rocking movement of one shaft to the other, said means including a member secured to the last mentioned shaft and projecting into the path of a moving part of each of the mold units and engageable therewith.

4. Feeding mechanism for rotary molding machines of the type including an annular series of mold units and means for rotating the same about a vertical axis, said mechanism comprising a stationary support, a rock-shaft pivoted to the support, a charging arm secured to the rock-shaft, charging instrumentalities on the arm, a second rock-shaft pivoted to the support, a cam member secured to the last mentioned rock-shaft and projecting into the path of movement of the mold units, a follower secured to the first mentioned rock-shaft and engaging the cam member, and means applying a torque to the first mentioned rock-shaft to cause the follower to engage the cam member.

5. Feeding mechanism for rotary molding machines of the type including an annular series of mold units and means for rotating the same about a vertical axis, said mechanism comprising a stationary support, a rock-shaft pivoted to the support, a charging arm secured to the rock-shaft, charging instrumentalities on the arm, a second rock-shaft pivoted to the support, a cam member secured to the last mentioned rock-shaft and projecting into the path of movement of the mold units, a follower secured to the first mentioned rock-shaft and engaging the cam member, and means applying a torque to the first mentioned rock-shaft to cause the follower to engage the cam member, said follower including a set screw in engagement with the cam member.

JOHN LAUTERBACH.